US012456589B2

(12) United States Patent
Xu et al.

(10) Patent No.: US 12,456,589 B2

(45) Date of Patent: Oct. 28, 2025

(54) APPARATUS FOR OPERATING AN ELECTRIC SWITCHING DEVICE

(71) Applicant: HITACHI ENERGY LTD, Zürich (CH)

(72) Inventors: Chao Xu, Beijing (CN); Hua Zhao, Beijing (CN); Xiaoli Yang, Beijing (CN); Zhipeng Yuan, Beijing (CN)

(73) Assignee: HITACHI ENERGY LTD, Zürich (CH)

( * ) Notice: Subject to any disclaimer, the term of this patent is extended or adjusted under 35 U.S.C. 154(b) by 459 days.

(21) Appl. No.: 17/921,390

(22) PCT Filed: May 19, 2020

(86) PCT No.: PCT/CN2020/091065

§ 371 (c)(1), (2) Date: Oct. 26, 2022

(87) PCT Pub. No.: WO2021/232241

PCT Pub. Date: Nov. 25, 2021

(65) Prior Publication Data

US 2023/0207229 A1 Jun. 29, 2023

(51) Int. Cl.

*H01H 3/26* (2006.01)
*H01H 3/40* (2006.01)

(52) U.S. Cl.

CPC ................ *H01H 3/26* (2013.01); *H01H 3/40* (2013.01)

(58) Field of Classification Search

CPC ............ H01H 3/26; H01H 3/40; H01H 3/227; H01H 3/3047; H01H 9/286; H01H 33/36; H01H 3/42; H01H 3/34

See application file for complete search history.

(56) References Cited

U.S. PATENT DOCUMENTS

| | | | | |
|---|---|---|---|---|
| 4,999,598 | A | 3/1991 | Jannesari et al. | |
| 6,175,089 | B1 * | 1/2001 | Kang | H01H 5/16 200/400 |
| 9,048,038 | B2 * | 6/2015 | Tak | H01H 3/40 |

FOREIGN PATENT DOCUMENTS

| | | | |
|---|---|---|---|
| CN | 101409173 | A | 4/2009 |
| CN | 102169765 | A | 8/2011 |

(Continued)

OTHER PUBLICATIONS

International Search Report and Written Opinion of the International Searching Authority, PCT/CN2020/091065, mailed Feb. 19, 2021, 10 pages.

*Primary Examiner* — Lheiren Mae A Caroc

(74) *Attorney, Agent, or Firm* — Sage Patent Group

(57) ABSTRACT

The apparatus includes a shaft rotatable to a plurality of predetermined positions to change a state of an electric switching device, a motor rotating the shaft via a transmission mechanism when the apparatus operates in an electric operating mode, and a braking mechanism configured to brake the motor in response to the shaft rotated to each position. The apparatus also includes a disc coupled to, and rotatable with the shaft and including a plurality of blocking parts and slots therebetween and a manual lever including a rotatable part and a projecting part arranged at an end thereto. In an apparatus manual operating mode, the projecting part is rotatable into the disc via one of the slots when the shaft is located at one of the positions, and slides out from the disc via another slot when the shaft is rotated to another one of the positions.

19 Claims, 13 Drawing Sheets

(56) References Cited

FOREIGN PATENT DOCUMENTS

| | | | |
|---|---|---|---|
| CN | 202363311 | U | 8/2012 |
| CN | 102881505 | A | 1/2015 |
| CN | 209266222 | U | 8/2019 |
| DE | 4142548 | A1 | 6/1993 |
| EP | 2620969 | B1 | 12/2015 |
| EP | 3336870 | A1 | 6/2018 |
| FR | 2857500 | A1 | 1/2005 |
| IN | 20110100413 | | 10/2011 |
| IN | 20140106013 | | 11/2015 |
| JP | 2002133981 | A | 5/2002 |
| JP | 04303895 | B2 | 7/2009 |
| JP | 2016157592 | A | 9/2016 |
| KR | 20040098340 | A | 2/2006 |
| KR | 20180104984 | A | 9/2018 |
| KR | 20190006200 | A | 1/2019 |
| RU | 178773 | U1 | 4/2018 |
| WO | 1996016419 | A1 | 5/1996 |
| WO | 1997016841 | A1 | 5/1997 |
| WO | 2005050684 | A1 | 6/2005 |
| WO | 2013026518 | A1 | 2/2013 |
| WO | 2018114725 | A1 | 6/2018 |

* cited by examiner

APPARATUS FOR OPERATING AN ELECTRIC SWITCHING DEVICE

CROSS REFERENCE TO RELATED APPLICATIONS

This application is a 35 U.S.C. 371 national stage application of PCT International Application No. PCT/CN2020/091065 filed on May 19, 2020, the disclosure and content of which is incorporated by reference herein in its entirety.

TECHNICAL FIELD

Embodiments of present disclosure generally relate to the field of electric switch drive devices, and more particularly, to an apparatus for operating an electric switching device.

BACKGROUND

Switchgears are provided in high-voltage electrical power systems to enable downstream equipment to be de-energised and isolated so as to permit, for example, repair, maintenance, or installation of a new component. In the switchgear, an electric component is typically connected to a power supply via a disconnector switch and to the ground through an earthing switch. Both the disconnector and earthing switches are interrupters, each of which comprises a fixed contact and a movable contact movable relative to the fixed contact. Under normal operating conditions, the disconnector switch of the electric component is closed and the earthing switch is opened. In some cases, however, the disconnector switch needs to be opened and the earthing switch needs to be closed for the purpose of testing/maintenance.

Conventionally, many operating mechanisms exist which comprises an actuating means for operating the disconnector and earthing switches. A main function of the operating mechanisms is to supply accurate angle output, torque and speed for the disconnector and earthing switches. However, existing operating mechanisms include a large number of components and are complex in structure, which increases the probability of malfunctioning. Further, due to large number of components, the operating mechanism occupies a significant space in the housing of the switchgear.

Hence, there is a need for an improved operating mechanism for actuating the disconnector switch and/or the earthing switch disposed in the switchgear.

SUMMARY

In view of the foregoing problems, various example embodiments of the present disclosure provide an improved operating mechanism for actuating an electric switching device, which is simple in structure, employs a fewer number of components, has ease of maintenance, is cost effective and enables a user to have precise control over the operation of the electric switching device.

In a first aspect of the present disclosure, example embodiments of the present disclosure provide an apparatus for operating an electric switching device. The apparatus comprises: a main shaft configured to be rotated to a plurality of predetermined positions to change a state of the electric switching device; a motor configured to rotate the main shaft via a transmission mechanism when the apparatus operates in an electric operating mode; a braking mechanism configured to brake the motor in response to the main shaft being rotated to each of the plurality of predetermined positions when the apparatus operates in the electric operating mode; a disc coupled to the main shaft and being rotatable along with the main shaft, the disc comprising a plurality of blocking parts and a plurality of slots between the plurality of blocking parts; and a manual lever comprising a rotatable part and a projecting part arranged at an end of the rotatable part, wherein in a manual operating mode of the apparatus, the projecting part is configured to be able to be rotated into the disc via one of the plurality of slots when the main shaft is located at one of the plurality of predetermined positions, and be able to slide out from the disc via another one of the plurality of slots when the main shaft is rotated to another one of the plurality of predetermined positions.

According to embodiments of the present disclosure, in the manual operating mode of the apparatus, an operator may rotate the manual lever such that its projecting part is rotated into the disc via one of the plurality of slots and blocked by one of the plurality of blocking parts, and once a desired position is reached, the projecting part may slide out from the disc via another one of the plurality of slots. In this way, the apparatus may automatically indicate whether the manual operation of the apparatus has reached the desired position, thus enabling precise control over the operation of the electric switching device.

In some embodiments, the apparatus further comprises: a base plate; and a rotating shaft coupled to the base plate and being rotatable with respect to the base plate, wherein the rotatable part of the manual lever is fixed on the rotating shaft and rotatable along with the rotating shaft.

In some embodiments, the rotating shaft is a cam shaft, the apparatus further comprises a first microswitch configured to be triggered by the cam shaft when the projecting part of the manual lever is rotated into the disc in the manual operating mode of the apparatus, and the braking mechanism is configured to be released in response to the first microswitch being triggered by the cam shaft.

In some embodiments, the apparatus further comprises a first spring configured to return the manual lever to its initial position when the projecting part slides out from the disc.

In some embodiments, the disc further comprises a plurality of locking holes, and the apparatus further comprises: a locking pin configured to be inserted into one of the plurality of locking holes during overhaul of the electric switching device; and a locking element configured to lock the locking pin when the locking pin is inserted into the one of the plurality of locking holes.

In some embodiments, the locking element is a padlock.

In some embodiments, the apparatus further comprises: a triggering element arranged on the locking pin and being movable along with the locking pin; and a second microswitch configured to be triggered by the triggering element when the locking pin is inserted into the one of the plurality of locking holes, wherein the motor is configured to be cut off in response to the second microswitch being triggered by the triggering element.

In some embodiments, the apparatus further comprises: a second spring configured to return the locking pin to its initial position when the locking pin is released from the one of the plurality of locking holes.

In some embodiments, the transmission mechanism comprises: a worm gear arranged on the main shaft and being rotatable along with the main shaft; a worm extending in a direction perpendicular to the main shaft and engaged with the worm gear; and a set of gears coupled between the worm and an output shaft of the motor.

In some embodiments, the set of gears comprise: a first gear engaged with the output shaft of the motor; and a second gear arranged on the worm and engaged with the first gear.

In some embodiments, the apparatus further comprises: a blocking plate arranged in front of the worm and provided with a handle hole into which a tool for rotating the worm can be inserted; and a blocking mechanism configured to at least partially block the handle hole when the apparatus operates in the electric operating mode and open the handle hole when the apparatus operates in the manual operating mode.

In some embodiments, the blocking mechanism comprises: a barrier configured to at least partially block the handle hole when the barrier is in its initial position; an electromagnet configured to be powered on when the apparatus operates in the manual operating mode so as to attract the barrier to move away from the handle hole, and be powered off when the apparatus operates in the electric operating mode; and a third spring configured to return the barrier to its initial position when the electromagnet is powered off.

In some embodiments, the apparatus further comprises an auxiliary switch configured to detect the position of the main shaft when the apparatus operates in the electric operating mode, wherein the motor is configured to be cut off in response to the auxiliary switch detecting that the main shaft has been rotated to one of the plurality of predetermined positions, and wherein the braking mechanism is configured to brake the motor in response to the auxiliary switch detecting that the main shaft has been rotated to one of the plurality of predetermined positions.

In some embodiments, the electric switching device comprises at least one of a disconnector switch and an earthing switch.

In some embodiments, the disc further comprises a mounting hole suitable for coupling the disc onto the main shaft.

In some embodiments, the mounting hole is an open hole or a close hole.

In some embodiments, the apparatus further comprises an adapter arranged on the main shaft and configured to adjust the mounting position of the disc on the main shaft, wherein the disc is fixed on the adapter through the mounting hole.

In some embodiments, the apparatus further comprises a position indicator arranged on the main shaft and configured to indicate the position of the main shaft.

In some embodiments, the apparatus further comprises a manual handle configured to release the braking mechanism when a power outage occurs in the apparatus.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or similar reference symbols are used to indicate the same or similar elements.

DETAILED DESCRIPTION OF EMBODIMENTS

Figure 1:
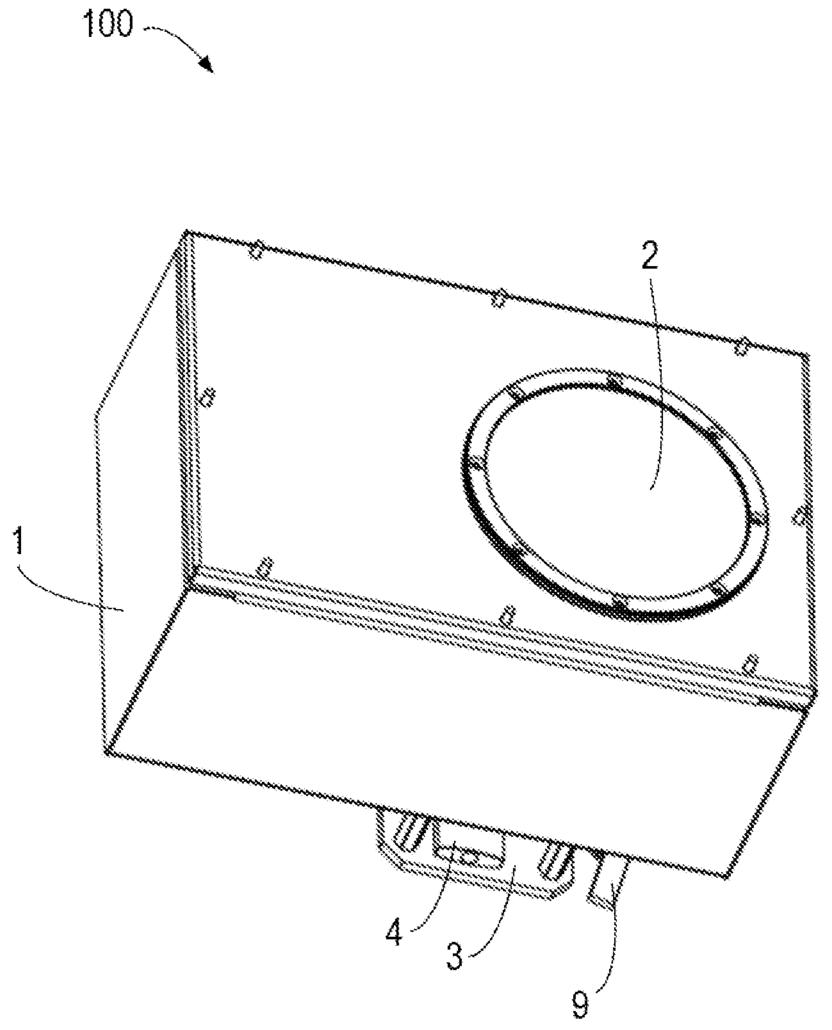
FIG. 1 is a perspective view illustrating an apparatus for operating an electric switching device in accordance with embodiments of the present disclosure.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

The term "comprises" or "includes" and its variants are to be read as open terms that mean "includes, but is not limited to." The term "or" is to be read as "and/or" unless the context clearly indicates otherwise. The term "based on" is to be read as based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below. A definition of a term is consistent throughout the description unless the context clearly indicates otherwise.

Figure 2:
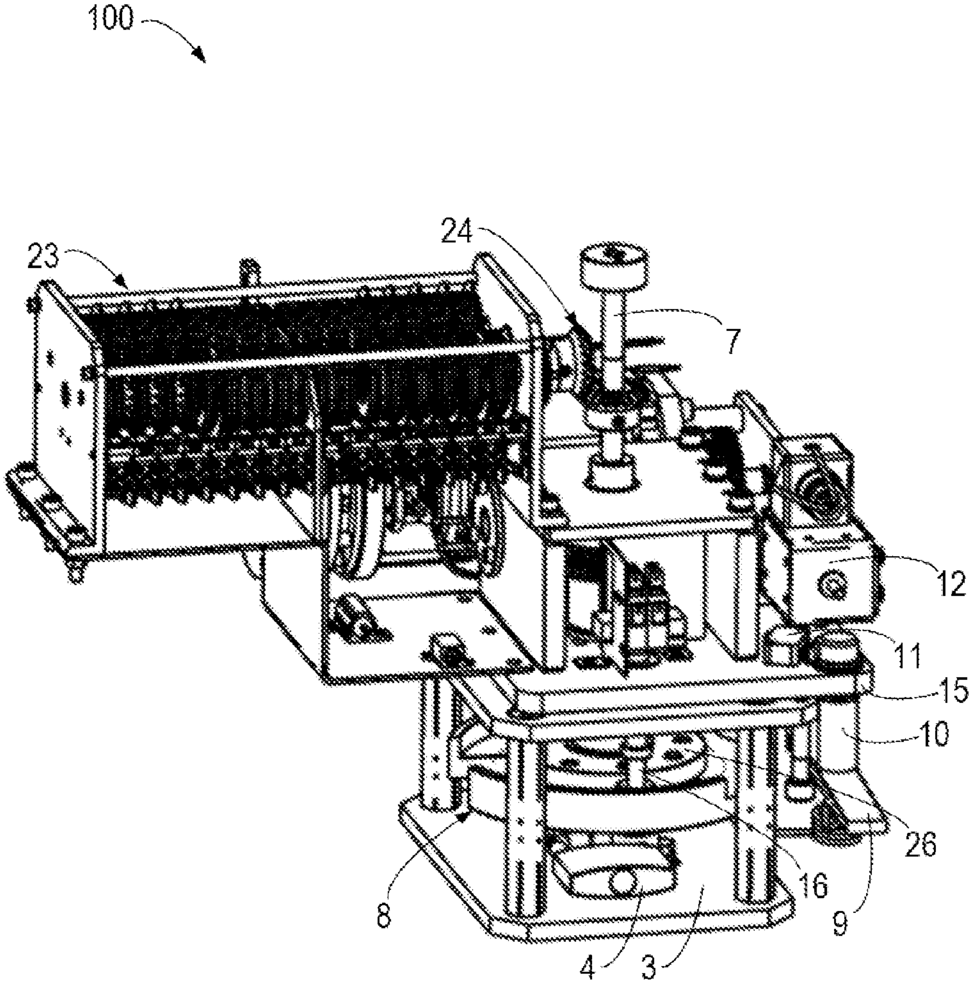
FIGS. 2-4 illustrate an internal structure of the apparatus as shown in FIG. 1 from different perspectives.
Figure 3:
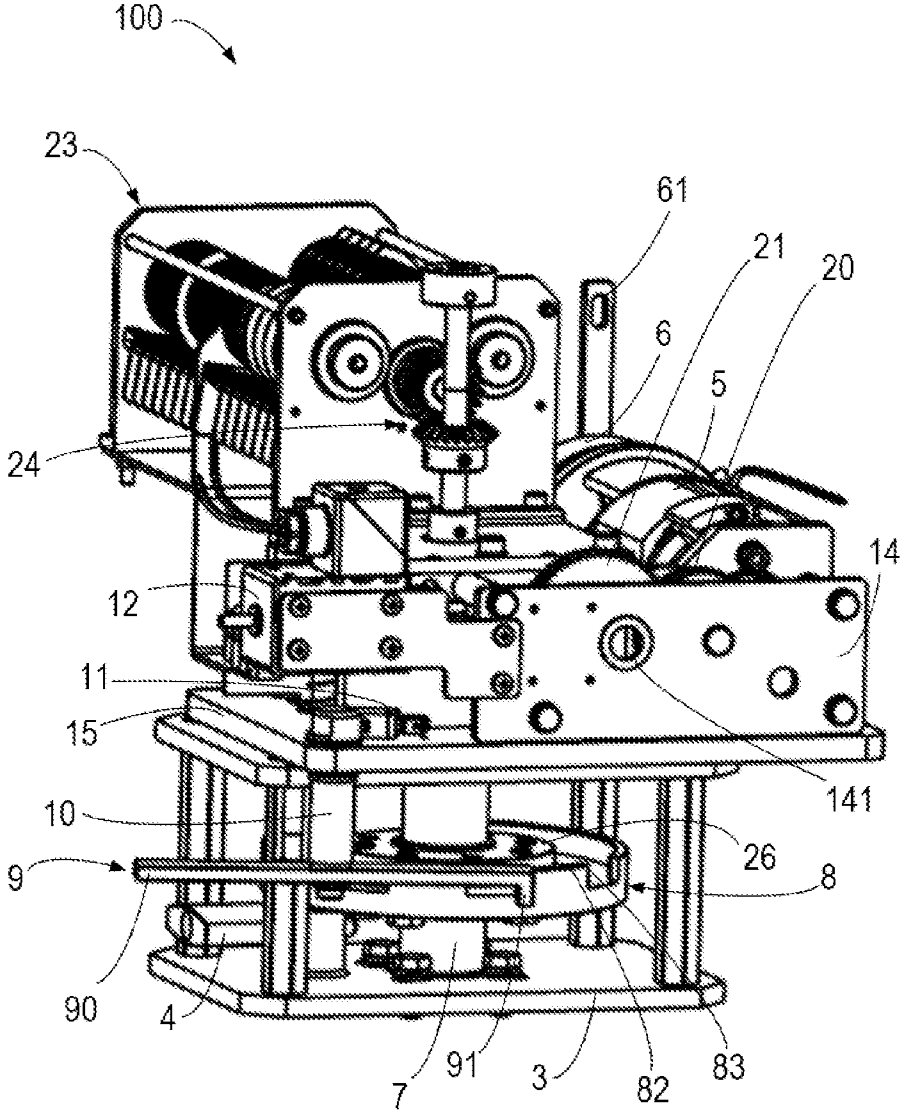
Figure 4:
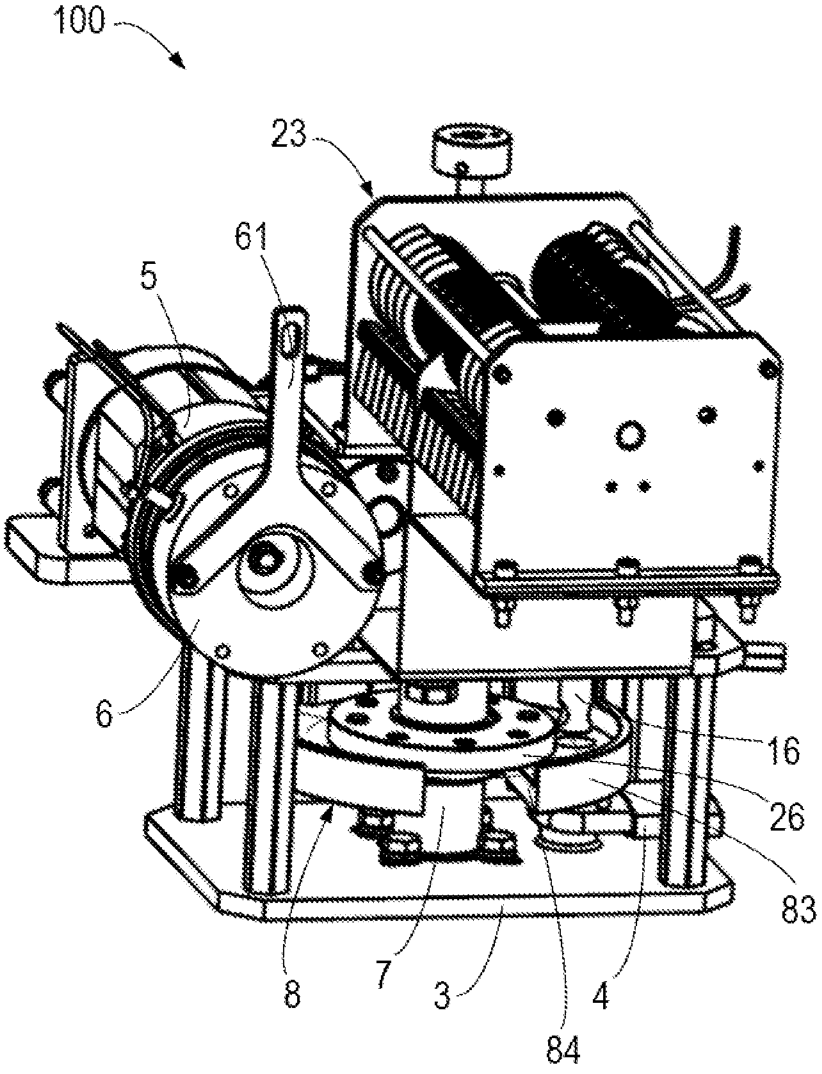
Figure 5:
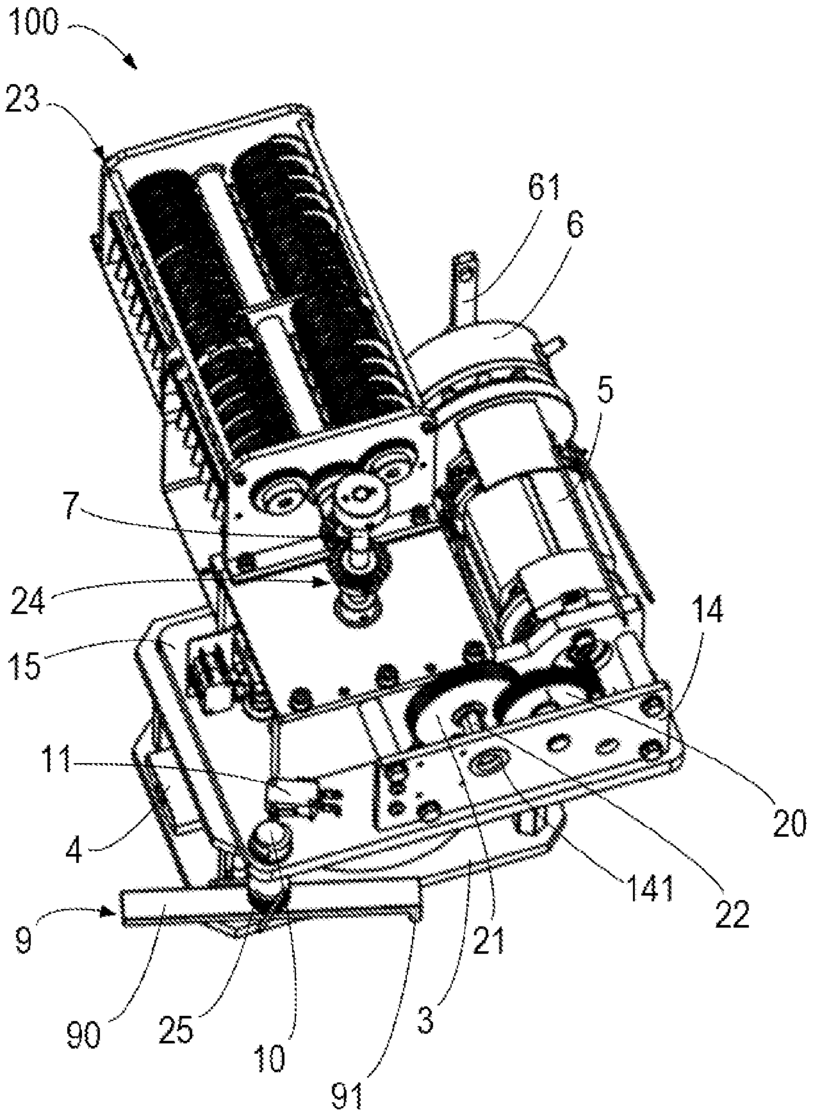
FIGS. 5 and 6 illustrate some structural details of the apparatus as shown in FIG. 2-4 from different perspectives.
Figure 6:
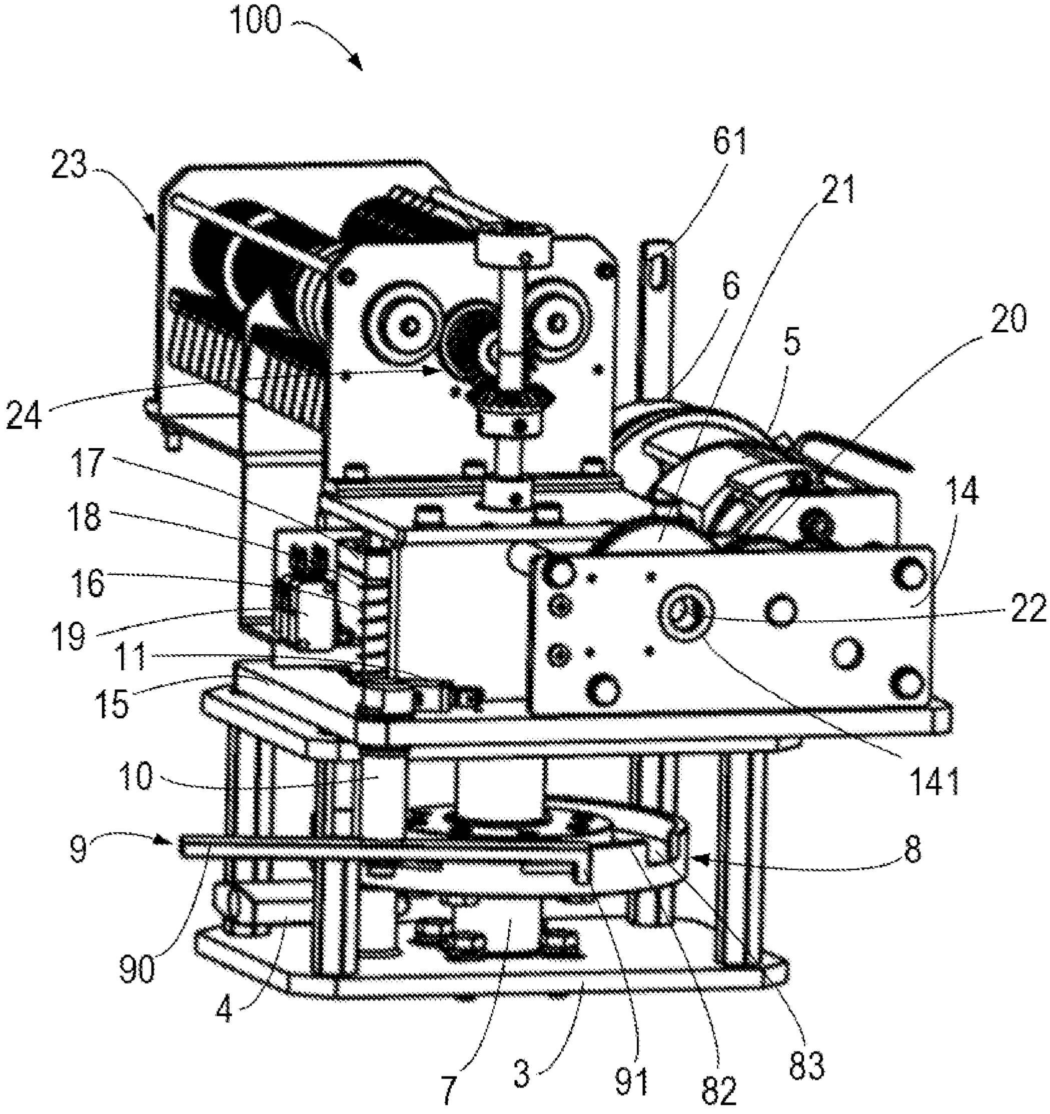
Figure 7:
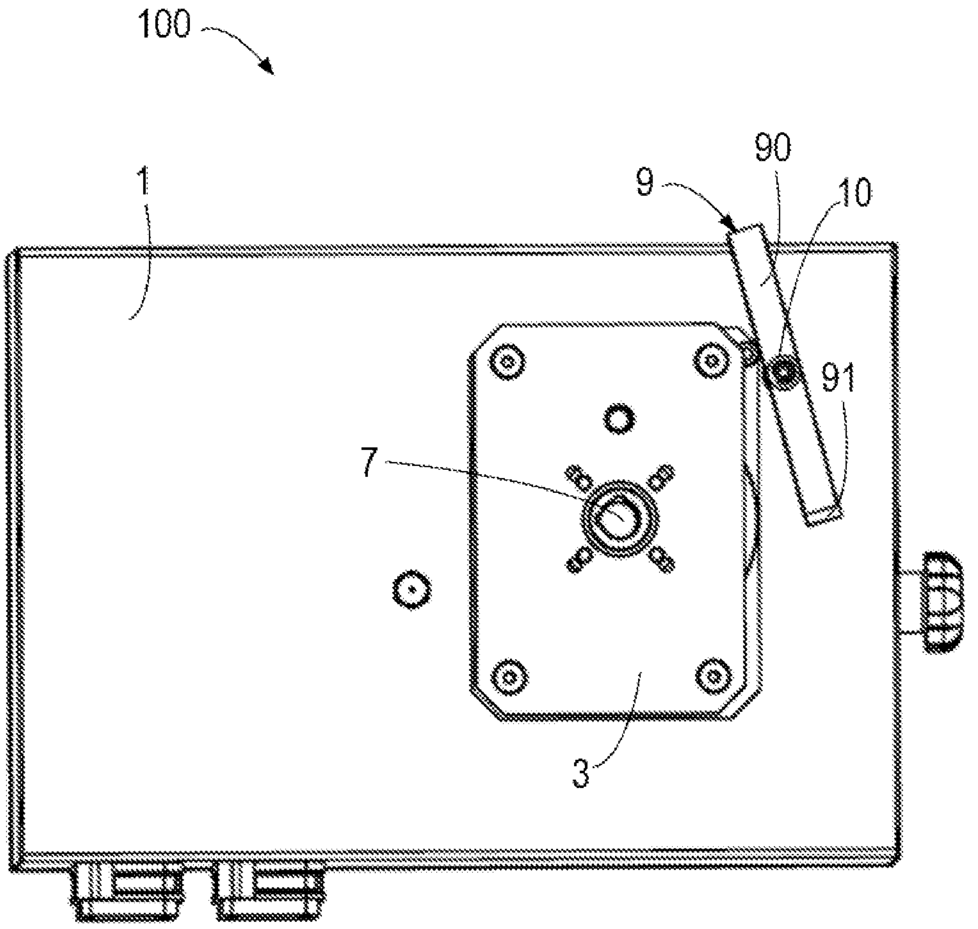
FIG. 7 is a bottom view of the apparatus as shown in FIG. 1.

Hereinafter, the principles of the present disclosure will be described in detail with reference to FIGS. 1-17. Referring to FIGS. 1-7 first, FIG. 1 is a perspective view illustrating an apparatus 100 for operating an electric switching device in accordance with embodiments of the present disclosure, FIGS. 2-4 illustrate an internal structure of the apparatus 100 as shown in FIG. 1 from different perspectives, FIGS. 5 and 6 illustrate some structural details of the apparatus 100 as shown in FIG. 2-4 from different perspectives, and FIG. 7 is a bottom view of the apparatus 100 as shown in FIG. 1.

In FIGS. 1-7, the electric switching device is not shown, so as to avoid obscuring structural details of the apparatus 100. According to embodiments of the present disclosure, the electric switching device may include at least one of a disconnector switch and an earthing switch. The disconnector and earthing switches are known in the art, and their specific structures and operations would not be described in detail herein. In some embodiments, the apparatus 100 may operate the disconnector switch or the earthing switch separately. In other embodiments, the apparatus 100 may operate a combination of the disconnector and earthing switches. It is to be understood that the disconnector and earthing switches are exemplary and other types of electric switching devices can be utilized without departing from the scope of the present disclosure.

As shown in FIG. 1, the apparatus 100 includes an enclosure 1 configured to receive some components of the apparatus 100. To clearly illustrate the internal structure of the apparatus 100, the enclosure 100 is removed in FIGS. 2-4.

As shown in FIGS. 2-7, the apparatus 100 includes a main shaft 7. The main shaft 7 is an output shaft of the apparatus 100. A bottom end of the main shaft 7 is to be coupled to the electric switching device, such as the disconnector switch and/or the earthing switch, so as to supply angle output, torque and speed for the electric switching device. During operation of the apparatus 100, the main shaft 7 may be rotated to a plurality of predetermined positions to change a state of the electric switching device, for example among an open state, a close state, and an earthing state. In some embodiments, the main shaft 7 may be rotated to three predetermined positions, e.g., a first position corresponding to the open state of the electric switching device, a second position corresponding to the close state of the electric switching device, and a third position corresponding to the earthing state of the electric switching device. However, it is to be understood that the three predetermined positions merely are exemplary and the main shaft 7 may be rotated to more or less than three predetermined positions, such as two, four, five, or more, according to adjusting requirements of the electric switching device.

During the operation of the apparatus 100, the position of the main shaft 7 may be indicated by an indicator. For example, in some embodiments, as shown in FIG. 1, the apparatus 100 further includes a position indicator 2 configured to indicate the position of the main shaft 7. The position indicator 2 may be arranged at a top end of the main shaft 7 and is visible through a window in the enclosure 1.

According to embodiments of the present disclosure, the apparatus 100 may operate the electric switching device in an electric operating mode or a manual operating mode. In the electric operating mode, the main shaft 7 may be driven by a motor 5 via a transmission mechanism, and in the manual operating mode, the main shaft 7 may be rotated by the operator manually.

In some embodiments, as shown in FIGS. 5 and 6, the transmission mechanism includes a worm gear (not shown) arranged on the main shaft 7, a worm 22 engaged with the worm gear and extending in a direction substantially perpendicular to the main shaft 7, and a set of gears coupled between the worm 22 and an output shaft of the motor 5. The worm 22 has an end suitable for the manual operation of apparatus 100. In the electric operating mode of the apparatus 100, the output shaft of the motor 5 may drive the set of gears to rotate, which in turn cause the worm 22 to rotate. Then, the worm 22 would drive the worm gear and the main shaft 7 to rotate simultaneously. In this way, the main shaft 7 may be rotated to different positions, so as to change the state of the electric switching device.

In an embodiment, as shown in FIGS. 5 and 6, the set of gears include a first gear 20 engaged with the output shaft of the motor 5 and a second gear 21 arranged on the worm 22 and engaged with the first gear 20. The worm 22 extends through the second gear 21. In the electric operating mode of the apparatus 100, the output shaft of the motor 5 may drive the first gear 20 to rotate, which in turn drives the second gear 21 to rotate. Since the second gear 21 is directly mounted on the worm 22, the second gear 21 would cause the worm 22 to rotate. Compared with a transmission mechanism for use in a conventional electric switch drive device, a set of gears replace a set of worm and worm gear, which increases the transmission efficiency of the whole transmission mechanism. In this way, the volume of the motor 5 could be reduced and less lubrication would be needed for the transmission mechanism.

It would be understood that illustration of the transmission mechanism merely is exemplary and other transmission mechanisms can be utilized without departing from the scope of the present disclosure.

In the electric operating mode of the apparatus 100, to cause the motor 5 to stop rotating rapidly when the main shaft 7 is rotated to each of the plurality of predetermined positions, a braking mechanism 6 is provided in the apparatus 100 to brake the motor 5. As shown in FIGS. 2-6, to detect whether the main shaft 7 has been rotated to each of the plurality of predetermined positions, an auxiliary switch 23 is provided in the apparatus 100. The auxiliary switch 23 is coupled to the main shaft 7 through gears 24.

In an embodiment, the auxiliary switch 23 includes a plurality of cams and a plurality of microswitches arranged under the plurality of cams. When the main shaft 7 is driven by the motor 5 to rotate in the electric operating mode of the apparatus 100, the cams in the auxiliary switch 23 may be driven to rotate and may trigger the corresponding microswitches when being rotated to predetermined angles. The predetermined angles correspond to the predetermined positions of the main shaft 7 respectively. With such an arrangement, the number of the predetermined angles and thus the number of the predetermined positions may be flexibly adjustable by the auxiliary switch 23 according to the adjusting requirements of the electric switching device. It is to be understood that the auxiliary switch 23 is not limited to the above configuration and may have various other configurations without departing from the scope of the present disclosure.

In the electric operating mode of the apparatus 100, when the auxiliary switch 23 detects that the main shaft 7 has been rotated to one of the plurality of predetermined positions, the microswitches in the auxiliary switch 23 may send trigger signals to the motor 5 and the braking mechanism 6. In response to the trigger signals, circuits of the motor 5 may be cut off and the braking mechanism 6 may brake the motor 5, such that the output shaft of the motor 5 stops rotating immediately. In this way, the main shaft 7 could be precisely stopped at each of the plurality of predetermined positions in the electric operating mode of the apparatus 100.

In some embodiments, as shown in FIGS. 3 and 5-6, the apparatus 100 further includes a blocking plate 14 arranged in front of the worm 22. The blocking plate 14 is provided with a handle hole 141 into which a tool for rotating the worm 22 can be inserted. In the manual operating mode of the apparatus 100, the operator may insert the tool into the handle hole 141 to rotate the worm 22. Then, the worm 22 would drive the worm gear and the main shaft 7 to rotate simultaneously. In this way, the main shaft 7 may be rotated to different positions, so as to change the state of the electric switching device. It is to be understood that the manual adjusting manner for the main shaft 7 described above merely is exemplary and the main shaft 7 may be adjusted in other manners in the manual operating mode of the apparatus 100 without departing from the scope of the present disclosure.

It is noted that in the manual operating mode of the apparatus 100, the circuits of the motor 5 are cut off and the braking mechanism 6 needs to be released. In this case, to indicate whether the main shaft 7 has been rotated to each of the plurality of predetermined positions, a disc 8 and a manual lever 9 are provided in the apparatus 100, as shown in FIGS. 1-7. During the manual operation of the apparatus 100, the disc 8 and the manual lever 9 may cooperate with each other to indicate whether the main shaft 7 has been adjusted to a desired position.

Figure 8:
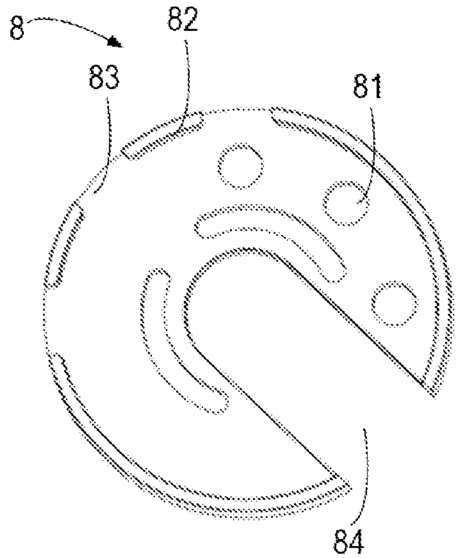
FIG. 8 is an enlarged diagram of the disc in the apparatus as shown in FIGS. 1-7.

As shown in FIGS. 2-4 and 6, the disc 8 is coupled to the main shaft 7 and rotatable along with the main shaft 7. In other words, the disc 8 is fixed on the main shaft 7, and during operation of the apparatus 100, the main shaft 7 and the disc 8 may rotate synchronously. FIG. 8 is an enlarged diagram of the disc 8 in the apparatus 100 as shown in FIGS. 1-7. As shown in FIG. 8, the disc 8 includes a plurality of blocking parts 82 arranged near an edge of the disc 8 and a plurality of slots 83 between adjacent blocking parts 82. The blocking parts 82 and the slots 83 could cooperate with the manual lever 9 during the manual operation of the apparatus 100, so as to indicate whether the main shaft 7 has been adjusted to the desired position.

As shown in FIGS. 3 and 5-6, the manual lever 9 includes a rotatable part 90 and a projecting part 91 arranged at an end of the rotatable part 90. In the manual operating mode of the apparatus 100, the projecting part 91 is able to be rotated into the disc 8 via one of the plurality of slots 83 when the main shaft 7 is located at one of the plurality of predetermined positions. During the rotation of the main shaft 7, the disc 8 would rotate along with the main shaft 7. As the disc 8 rotates, the projecting part 91 would be blocked by one of the blocking parts 82 before reaching the other one of the plurality of slots 83, and would slide out from the disc 8 via the other one of the plurality of slots 83 when the main shaft 7 is rotated to another one of the plurality of predetermined positions.

As discussed above, in some embodiments, the main shaft 7 may be rotated to three predetermined positions, e.g., a first position corresponding to the open state of the electric switching device, a second position corresponding to the close state of the electric switching device, and a third position corresponding to the earthing state of the electric switching device. In order to indicate the three predetermined positions of the main shaft 7 in the manual operating mode of the apparatus 100, three slots 83 corresponding to the first, second and third positions respectively are provided on the disc 8, as shown in FIG. 8. When the main shaft 7 is at each of the three predetermined positions, the projecting part 91 of the manual lever 9 could be rotated into or slide out from the disc 8 via the corresponding slot 83.

As shown in FIG. 3, at the beginning of the manual operation of the apparatus 100, the operator may rotate the rotatable part 90 of the manual lever 9 such that the projecting part 91 is rotated into the disc 8 via one slot 83. Then, the operator may rotate the main shaft 7 through using the tool inserted into the handle hole 141. During the rotation of the main shaft 7, the disc 8 would rotate along with the main shaft 7. As the disc 8 rotates, the projecting part 91 would be blocked by one blocking part 82, and may slide out from the disc 8 via another slot 83 once the main shaft 7 has been rotated to the desired position. In this way, the operator may timely know that the main shaft 7 has been rotated to the desired position, and stop adjusting the main shaft 7.

It is to be understood that three slots 83 on the disc 8 merely are exemplary, and more or less slots 83 may be provided on the disc 8 so as to indicate more or less predetermined positions, which will be described in detail with reference to FIGS. 9-11 hereinafter.

In an embodiment, as shown in FIG. 8, to mount the disc 8 onto the main shaft 7, the disc 8 further includes a mounting hole 84. As shown, the mounting hole 84 may be an open hole. With such an open mounting hole 84, the disc 8 may be easily assembled onto or disassembled from the main shaft 7 on site.

In an embodiment, as shown in FIGS. 2-4, the apparatus 100 further includes an adapter 26 arranged on the main shaft 7 and configured to adjust the mounting position of the disc 8 on the main shaft 7. The disc 8 is fixed on the adapter 26 through the mounting hole 84. With such an arrangement, the mounting position of the disc 8 on the main shaft 7 could be adjusted precisely during factory assembling. It is to be understood that mounting the disc 8 onto the main shaft 7 through the adapter 26 merely is exemplary and the disc 8 may be coupled to the main shaft 7 in various manners without departing from the scope of the present disclosure.

In some embodiments, during overhaul of the electric switching device, the disc 8 may be locked by a locking pin 16 as shown in FIGS. 2, 4 and 6, so as to prevent the main shaft 7 from being rotated. To this end, as shown in FIG. 8, the disc 8 is provided with a plurality of locking holes 81. The locking pin 16 is configured to be inserted into one of the plurality of locking holes 81 during the overhaul of the electric switching device. In addition, a locking element 4 is provided in the apparatus 100 to lock the locking pin 16 with a support 3 of the apparatus 100 when the locking pin 16 is inserted into the one of the plurality of locking holes 81. The locking element 4 may be a padlock or of other types.

Figure 17:
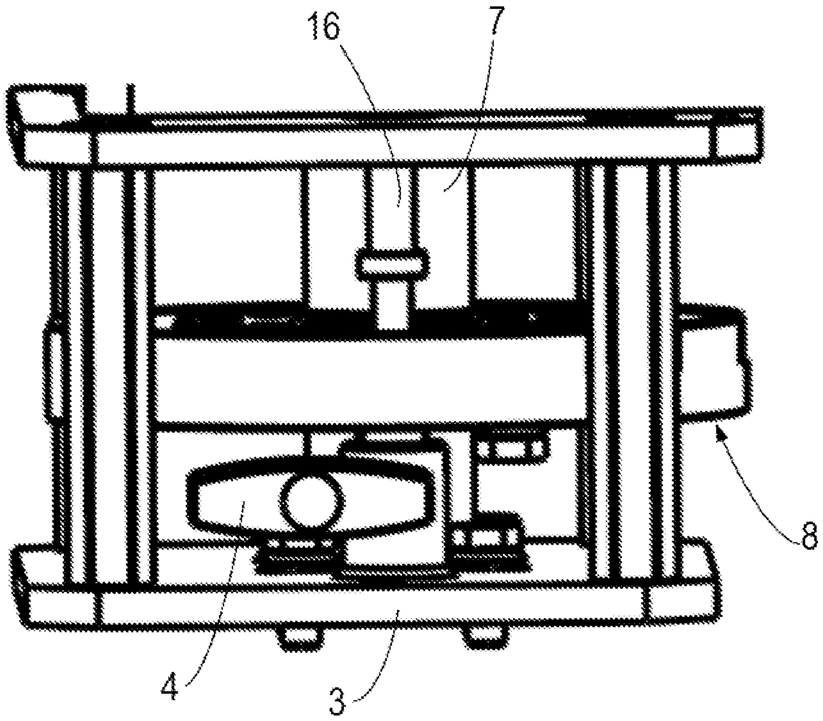
FIG. 17 is a schematic view illustrating the locking of the locking pin with the support via the locking element.

FIG. 17 is a schematic view illustrating the locking of the locking pin 16 with the support 3 via the locking element 4. As shown, when the locking pin 16 is locked with the support 3 via the locking element 4 during the overhaul of the electric switching device, the disc 8 cannot be rotated electrically or manually, so as to ensure the safety of the operator.

It is noted that three locking holes 81 are provided on the disc 8 as shown in FIG. 8 so as to lock the disc 8. However, it is to be understood that in other embodiments, more or less locking holes 81 may be provided on the disc 8, which will be described in detail with reference to FIGS. 9-11 hereinafter.

Figure 9:
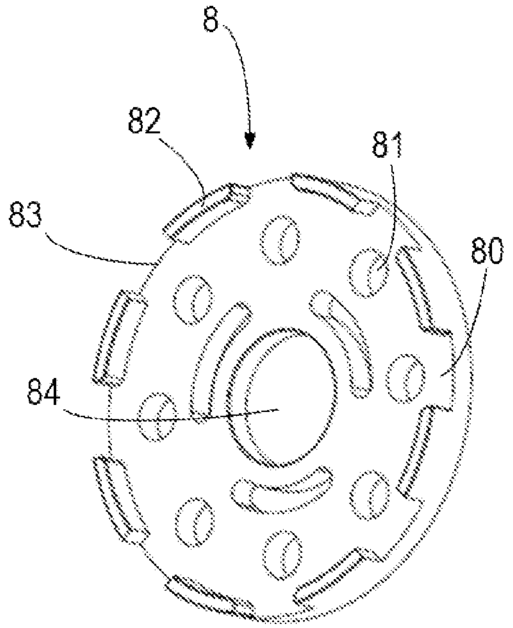
FIG. 9-11 are perspective views illustrating the disc in accordance with other embodiments of the present disclosure.
Figure 10:
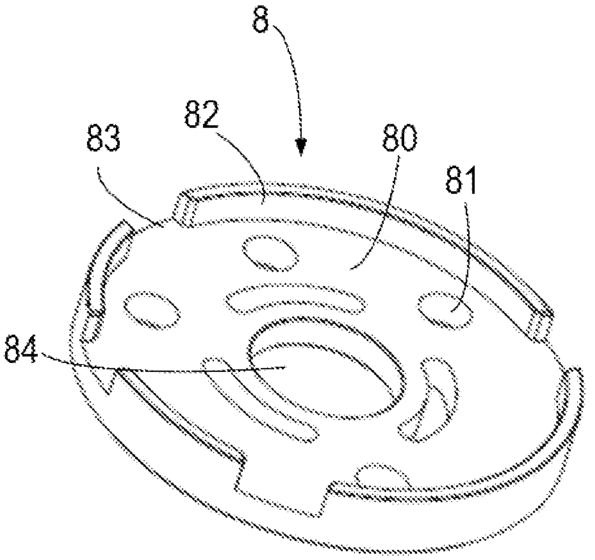
Figure 11:
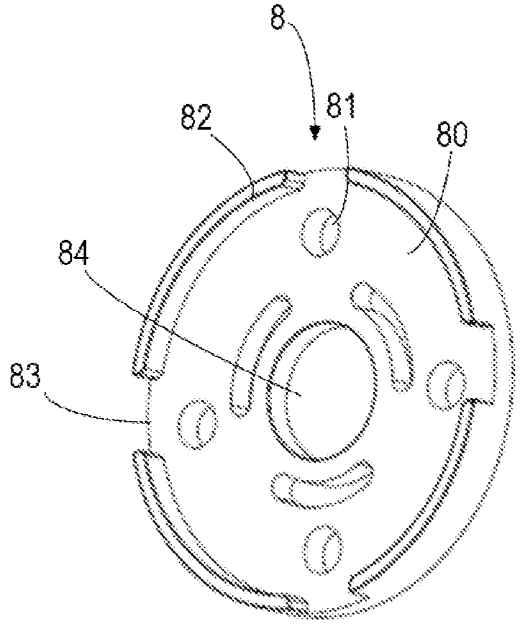

FIGS. 9-11 are perspective views illustrating the disc 8 in accordance with other embodiments of the present disclosure.

In comparison with the disc 8 as shown in FIG. 8, the disc 8 as shown in FIG. 9 includes more blocking parts 82 and more slots 83, for example eight blocking parts 82 and eight slots 83. The blocking parts 82 and slots 83 are generally evenly arranged on the disc 8. That is, the angles between adjacent slots 83 are substantially equal to each other. With such an arrangement, the slots 83 may correspond to more predetermined positions (e.g., eight) of the main shaft 7. During the manual operation of the apparatus 100, the operator may rotate the manual lever 9 into the disc 8, and timely know that the main shaft 7 has been rotated to the desired position and stop adjusting the main shaft 7.

In addition, instead of the open mounting hole 84 as shown in FIG. 8, the mounting hole 84 of the disc 8 as shown in FIG. 9 is a close hole. Again, the disc 8 may be fixed on the main shaft 7 through the adapter 26. Furthermore, the disc 8 is provided with eight locking holes 81. The locking pin 16 may be inserted into one of the plurality of locking holes 81 during the overhaul of the electric switching device so as to lock the disc 8.

In comparison with the disc 8 as shown in FIG. 8, the disc 8 as shown in FIG. 10 includes more blocking parts 82 and more slots 83, such as four blocking parts 82 and four slots 83. The blocking parts 82 and slots 83 are unevenly arranged on the disc 8. That is, the angles between adjacent slots 83 are not the same. The slots 83 may correspond to more predetermined positions (e.g., four) of the main shaft 7. In addition, the mounting hole 84 of the disc 8 as shown in FIG. 10 is a close hole and the disc 8 is provided with four locking holes 81.

In analogy to the disc 8 as shown in FIG. 10, the disc 8 as shown in FIG. 11 also includes four blocking parts 82 and four slots 83. The disc 8 as shown in FIG. 11 differs from the disc 8 as shown in FIG. 10 in that the blocking parts 82 and slots 83 of the disc 8 as shown in FIG. 11 are evenly arranged on the disc 8.

It is to be understood the number of the blocking parts 82 and slots 83 on the disc 8 are not limited to the implementations described above with reference to FIGS. 8-11. In other embodiments, more or less blocking parts 82 and slots 83 may be provided on the disc 8.

In some embodiments, as shown in FIG. 5, the apparatus 100 further includes a first spring 25 configured to return the manual lever 9 to its initial position when the projecting part 91 slides out from the disc 8. When the main shaft 7 is rotated to the desired position in the manual operating mode of the apparatus 100, the manual lever 9 may automatically slide out from the disc 8 and return to its initial position under action of the first spring 25.

In an embodiment, as shown in FIGS. 2-6, the apparatus 100 further includes a base plate 15 and a rotating shaft 10 coupled to the base plate 15. The rotating shaft 10 is rotatable with respect to the base plate 15. The rotatable part 90 of the manual lever 9 is fixed on the rotating shaft 10 and rotatable along with the rotating shaft 10. In another embodiment, the rotating shaft 10 may be fixed on the base plate 15 and the rotatable part 90 of the manual lever 9 is arranged on the rotating shaft 10 and rotatable with respect to the rotating shaft 10. In other embodiments, the rotatable part 90 of the manual lever 9 may be arranged in the apparatus 100 in other manners. The scope of the present disclosure is not intended to be limited in this respect.

As described above, in the manual operating mode of the apparatus 100, the braking mechanism 6 needs to be released. To this end, as shown in FIGS. 2-3 and 5-6, the rotating shaft 10 is a cam shaft rotatable along with the manual lever 9, and the apparatus 100 further includes a first microswitch 11 arranged on the base plate 15. The first microswitch 11 is configured to be triggered by the cam shaft when the projecting part 91 of the manual lever 9 is rotated into the disc 8 in the manual operating mode of the apparatus 100.

Figure 12:
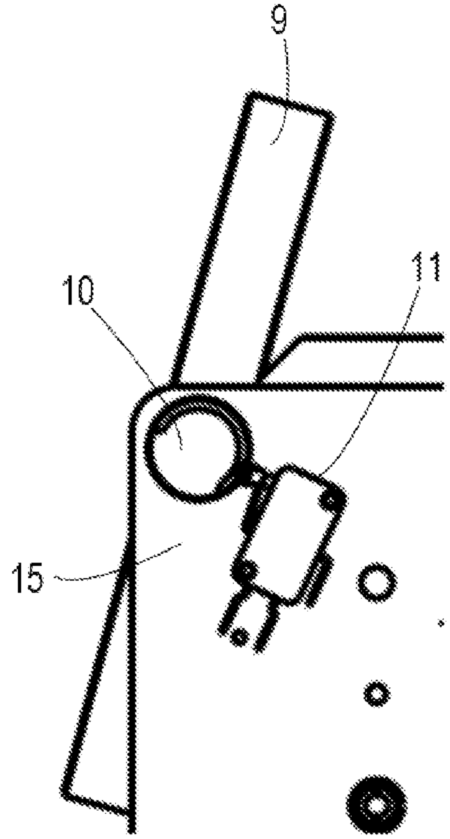
FIGS. 12 and 13 illustrate an adjusting process of the manual lever.
Figure 13:
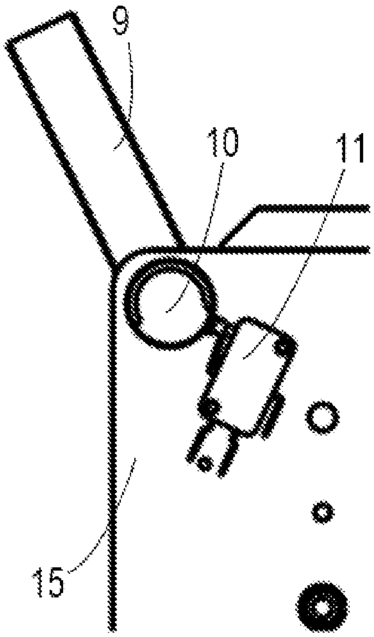

FIGS. 12 and 13 illustrate an adjusting process of the manual lever 9. As shown in FIG. 12, when the manual lever 9 is at its initial position, the first microswitch 11 is not triggered by the cam shaft. As shown in FIG. 13, when the projecting part 91 of the manual lever 9 is rotated into the disc 8 in the manual operating mode of the apparatus 100, the first microswitch 11 would be triggered by the cam shaft and send a release signal to the braking mechanism 6 to release the braking mechanism 6. As such, the braking mechanism 6 would no longer brake the motor 5 in the manual operating mode of the apparatus 100.

The conventional electric switch drive device typically uses a complex clutch system to disconnect the output shaft of the motor with next stage gears. It leads that the operator would have to keep a force for a clutch handle during the manual operation. In comparison with the conventional electric switch drive device, the first microswitch 11 and the cam shaft of the apparatus 100 described herein are simple in structure and easy to operate, reducing the number of components in the apparatus 100 and improving the stability of the apparatus 100.

In some embodiments, as shown in FIGS. 3-6, the apparatus 100 further includes a manual handle 61 configured to release the braking mechanism 6 when a power outage occurs in the apparatus 100.

In the electric operating mode of the apparatus 100, it would be very dangerous if any one inserts the tool into the handle hole 141 to operate the main shaft 7. In order to prevent the manual operation of the main shaft 7 in the electric operating mode of the apparatus 100, the apparatus 100 further includes a blocking mechanism. The blocking mechanism may block the handle hole 141 when the apparatus 100 operates in the electric operating mode and open the handle hole 141 when the apparatus 100 operates in the manual operating mode.

Figure 14:
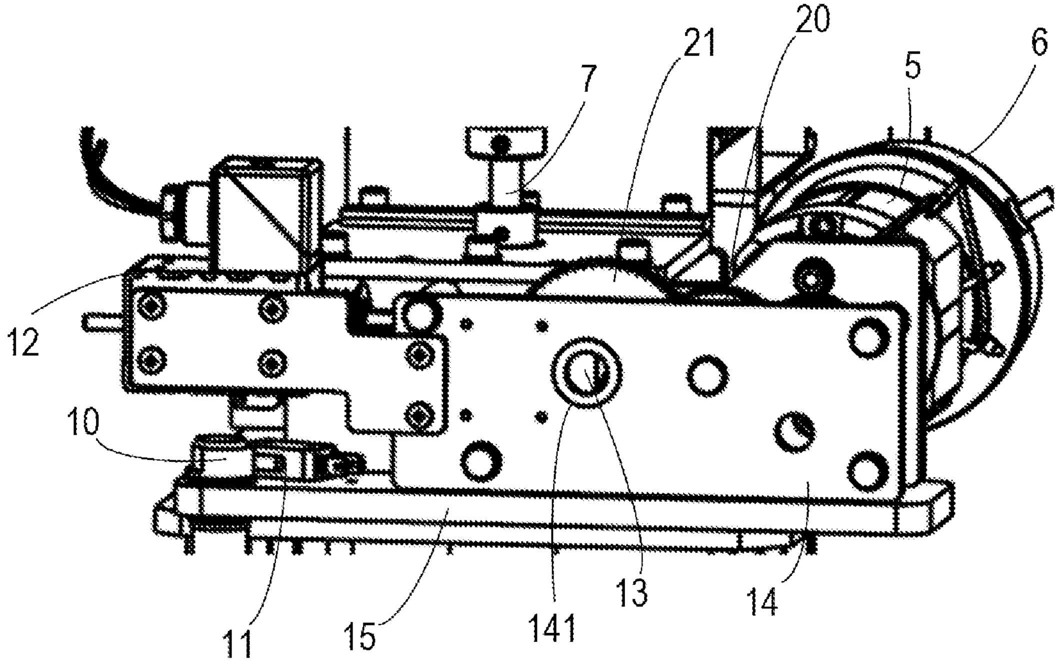
FIGS. 14 and 15 illustrate an example arrangement of a blocking mechanism for blocking a handle hole into which a tool for rotating the worm can be inserted.
Figure 15:
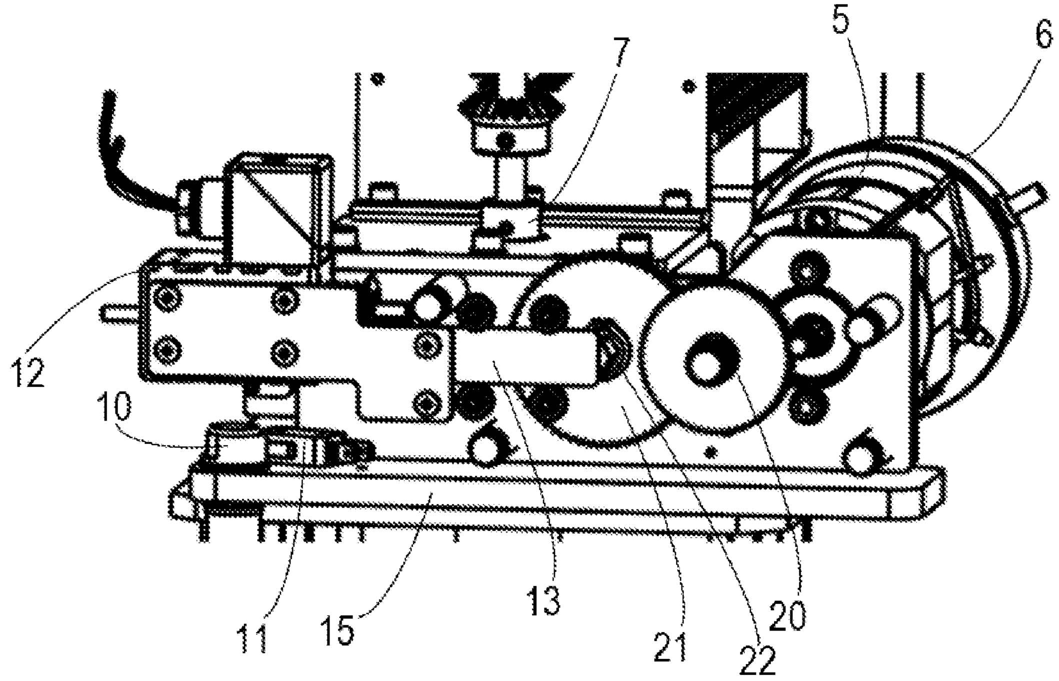

FIGS. 14 and 15 illustrate an example arrangement of the blocking mechanism. As shown, the blocking mechanism includes a barrier 13, an electromagnet 12 and a third spring (no shown). The barrier 13 is configured to block the handle hole 141 in its initial position. The electromagnet 12 is configured to be powered on when the apparatus 100 operates in the manual operating mode so as to attract the barrier 13 to move away from the handle hole 141, and be powered off when the apparatus 100 operates in the electric operating mode so as to release the barrier 13. The third spring is connected to the barrier 13 and configured to return the barrier 13 to its initial position when the electromagnet 12 is powered off.

In the electric operating mode of the apparatus 100, the electromagnet 12 would be powered off and not attract the barrier 13. In this case, the barrier 13 is in its initial position and blocks the handle hole 141. Thus, the tool for rotating the main shaft 7 cannot be inserted into the handle hole 141, which is better to prevent misoperation. In the manual operating mode of the apparatus 100, the electromagnet 12 would be powered on and attract the barrier 13 to move away from the handle hole 141. In this case, the handle hole 141 would no longer be blocked by the barrier 13. Thus, the tool for rotating the main shaft 7 can be inserted into the handle hole 141.

In some embodiments, as shown in FIGS. 2, 4, and 6, in a case that the disc 8 is locked by the locking pin 16, the circuits of the motor 5 need to be prevented from being switched on so as to avoid any damage on the components of the apparatus 100 due to the accidental switching on of the motor 5. To this end, the apparatus 100 further includes a triggering element 17 and a second microswitch 19.

Figure 16:
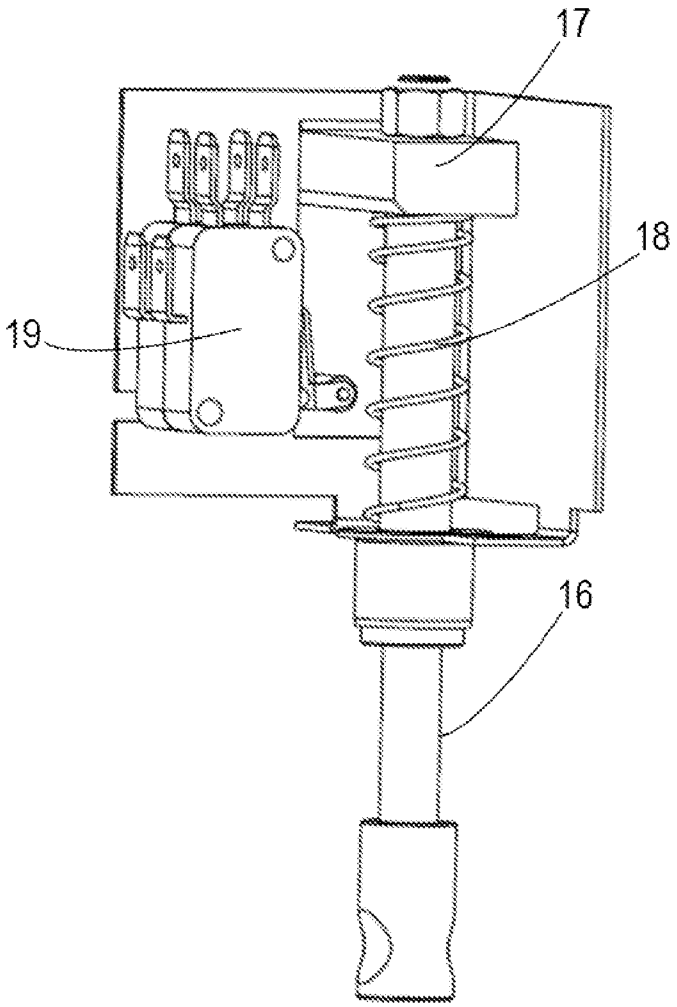
FIG. 16 is a schematic view illustrating a relative arrangement of the locking pin, the triggering element and the second microswitch of the apparatus as shown in FIG. 6.

FIG. 16 is a schematic view illustrating a relative arrangement of the locking pin 16, the triggering element 17 and the second microswitch 19 of the apparatus 100 as shown in FIG. 6. As shown in FIG. 16, the triggering element 17 is arranged on the locking pin 16 and movable along with the locking pin 16. The second microswitch 19 is configured to be triggered by the triggering element 17 when the locking pin 16 is pulled downwards and inserted into the one of the plurality of locking holes 81. In response to the second microswitch 19 being triggered by the triggering element 17, the circuits of the motor 5 would be cut off and may not be switched on in the case that the disc 8 is locked by the locking pin 16.

In an embodiment, as shown in FIG. 16, the apparatus 100 further includes a second spring 18 configured to return the locking pin 16 to its initial position when the locking pin 16 is released from the one of the plurality of locking holes 81.

The apparatus 100 as described herein has more internal space and better layout than the conventional electric switch drive devices, and thus may be used in various switchgears, such as plug and switch system (PASS) or gas insulated switchgear (GIS).

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. An apparatus for operating an electric switching device, comprising:

a main shaft configured to be rotated to a plurality of predetermined positions to change a state of the electric switching device;

a motor configured to rotate the main shaft via a transmission mechanism when the apparatus operates in an electric operating mode;

a braking mechanism configured to brake the motor in response to the main shaft being rotated to each of the plurality of predetermined positions when the apparatus operates in the electric operating mode;

a disc coupled to the main shaft and being rotatable along with the main shaft, the disc comprising a plurality of blocking parts and a plurality of slots between the plurality of blocking parts; and a manual lever comprising a rotatable part and a projecting part arranged at an end of the rotatable part, wherein in a manual operating mode of the apparatus, the projecting part is configured to be able to be rotated into the disc via one of the plurality of slots when the main shaft is located at one of the plurality of predetermined positions, and be able to slide out from the disc via another one of the plurality of slots when the main shaft is rotated to another one of the plurality of predetermined positions.

2. The apparatus according to claim 1, further comprising:

a base plate; and a rotating shaft coupled to the base plate and being rotatable with respect to the base plate, wherein the rotatable part of the manual lever is fixed on the rotating shaft and rotatable along with the rotating shaft.

3. The apparatus according to claim 2, wherein the rotating shaft is a cam shaft, wherein the apparatus further comprises a first microswitch configured to be triggered by the cam shaft when the projecting part of the manual lever is rotated into the disc in the manual operating mode of the apparatus, and wherein the braking mechanism is configured to be released in response to the first microswitch being triggered by the cam shaft.

4. The apparatus according to claim 1, further comprising a first spring configured to return the manual lever to an initial position of the manual lever when the projecting part slides out from the disc.

5. The apparatus according to claim 1, wherein the disc further comprises a plurality of locking holes, and wherein the apparatus further comprises:

a locking pin configured to be inserted into one of the plurality of locking holes during overhaul of the electric switching device; and a locking element configured to lock the locking pin when the locking pin is inserted into the one of the plurality of locking holes.

6. The apparatus according to claim 5, wherein the locking element is a padlock.

7. The apparatus according to claim 5, further comprising:

a triggering element arranged on the locking pin and being movable along with the locking pin; and a second microswitch configured to be triggered by the triggering element when the locking pin is inserted into the one of the plurality of locking holes, wherein the motor is configured to be cut off in response to the second microswitch being triggered by the triggering element.

8. The apparatus according to claim 5, further comprising:

a second spring configured to return the locking pin to an initial position of the locking pin when the locking pin is released from the one of the plurality of locking holes.

9. The apparatus according to claim 1, wherein the transmission mechanism comprises:

a worm extending in a direction perpendicular to the main shaft; and a set of gears coupled between the worm and an output shaft of the motor.

10. The apparatus according to claim 9, wherein the set of gears comprise:

a first gear engaged with the output shaft of the motor; and a second gear arranged on the worm and engaged with the first gear.

11. The apparatus according to claim 9, further comprising:

a blocking plate arranged in front of the worm and provided with a handle hole into which a tool for rotating the worm can be inserted; and a blocking mechanism configured to at least partially block the handle hole when the apparatus operates in the electric operating mode and open the handle hole when the apparatus operates in the manual operating mode.

12. The apparatus according to claim 11, wherein the blocking mechanism comprises:

a barrier configured to at least partially block the handle hole when the barrier is in an initial position of the barrier;

an electromagnet configured to be powered on when the apparatus operates in the manual operating mode so as to attract the barrier to move away from the handle hole, and be powered off when the apparatus operates in the electric operating mode; and a third spring configured to return the barrier to the initial position of the barrier when the electromagnet is powered off.

13. The apparatus according to claim 1, further comprising an auxiliary switch configured to detect the position of the main shaft when the apparatus operates in the electric operating mode, wherein the motor is configured to be cut off in response to the auxiliary switch detecting that the main shaft has been rotated to one of the plurality of predetermined positions, and wherein the braking mechanism is configured to brake the motor in response to the auxiliary switch detecting that the main shaft has been rotated to one of the plurality of predetermined positions.

14. The apparatus according to claim 1, wherein the electric switching device comprises at least one of a disconnector switch and an earthing switch.

15. The apparatus according to claim 1, wherein the disc further comprises a mounting hole suitable for coupling the disc onto the main shaft.

16. The apparatus according to claim 15, wherein the mounting hole is an open hole or a close hole.

17. The apparatus according to claim 15, further comprising an adapter arranged on the main shaft and configured to adjust the mounting position of the disc on the main shaft.

18. The apparatus according to claim 1, further comprising a position indicator arranged on the main shaft and configured to indicate a position of the main shaft.

19. The apparatus according to claim 1, further comprising a manual handle configured to release the braking mechanism when a power outage occurs in the apparatus.

* * * * *